US012106718B2

(12) United States Patent
He et al.

(10) Patent No.: US 12,106,718 B2
(45) Date of Patent: Oct. 1, 2024

(54) DRIVING METHOD AND DRIVING DEVICE FOR A DISPLAY PANEL, AND DISPLAY DEVICE

(71) Applicant: HEFEI VISIONOX TECHNOLOGY CO., LTD., Anhui (CN)

(72) Inventors: Wangwang He, Hefei (CN); Yonggang Li, Hefei (CN); Weiwei Pan, Hefei (CN)

(73) Assignee: HEFEI VISIONOX TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 18/240,831

(22) Filed: Aug. 31, 2023

(65) Prior Publication Data

US 2023/0410751 A1 Dec. 21, 2023

Related U.S. Application Data

(63) Continuation of application No. PCT/CN2022/088091, filed on Apr. 21, 2022.

(30) Foreign Application Priority Data

Sep. 26, 2021 (CN) .......................... 202111129797.1

(51) Int. Cl.
*G09G 3/3258* (2016.01)
*G09G 3/3233* (2016.01)

(52) U.S. Cl.
CPC ......... *G09G 3/3258* (2013.01); *G09G 3/3233* (2013.01); *G09G 2300/0819* (2013.01);
(Continued)

(58) Field of Classification Search
CPC .. G09G 3/3258; G09G 3/3233; G09G 3/3208; G09G 3/3291; G09G 2300/0819; G09G 2300/0842; G09G 2300/0861; G09G 2300/0809; G09G 2320/0233; G09G 2320/0247; G09G 2320/0626; G09G 2320/0214; G09G 2340/0435; G09G 2360/145; G09G 2360/147; G09G 2360/16
See application file for complete search history.

(56) References Cited

FOREIGN PATENT DOCUMENTS

CN 103597534 A 2/2014
CN 106782259 A 5/2017
(Continued)

OTHER PUBLICATIONS

International Search Report issued on Jul. 4, 2022, in corresponding International Application No. PCT/CN2022/088091, 6 pages.
(Continued)

*Primary Examiner* — Stephen G Sherman
(74) *Attorney, Agent, or Firm* — Maier & Maier, PLLC

(57) ABSTRACT

A driving method and driving device for a display panel, and a display device. The driving method includes: in a first driving stage, controlling a data voltage signal input terminal to transmit a voltage corresponding to a data voltage to a gate of a drive transistor; and in a second driving stage, controlling the data voltage signal input terminal to transmit a hold voltage to a source of the drive transistor to couple the voltage of the gate of the drive transistor through the hold voltage of the source of the drive transistor.

20 Claims, 8 Drawing Sheets

(52) U.S. Cl.
CPC ............... *G09G 2300/0842* (2013.01); *G09G 2300/0861* (2013.01); *G09G 2320/0233* (2013.01); *G09G 2320/0247* (2013.01); *G09G 2320/0626* (2013.01); *G09G 2360/145* (2013.01)

(56) References Cited

FOREIGN PATENT DOCUMENTS

| | | | | | |
|---|---|---|---|---|---|
| CN | 107871474 | A | | 4/2018 | |
| CN | 110176213 | A | | 8/2019 | |
| CN | 111653238 | A | | 9/2020 | |
| CN | 111862890 | A | | 10/2020 | |
| CN | 112150967 | A | | 12/2020 | |
| CN | 112581907 | A | | 3/2021 | |
| CN | 112634822 | A | | 4/2021 | |
| CN | 112634832 | A | | 4/2021 | |
| CN | 213277408 | U | | 5/2021 | |
| CN | 113823222 | A | | 12/2021 | |
| CN | 114038429 | A | | 2/2022 | |
| KR | 20170006335 | A | | 1/2017 | |
| KR | 1020170051795 | A | | 5/2017 | |
| KR | 20170081082 | A | | 7/2017 | |
| KR | 1020200058847 | A | | 5/2020 | |
| WO | WO-2005069267 | A1 | * | 7/2005 | ........... G09G 3/3233 |
| WO | 2021149922 | A1 | | 7/2021 | |

OTHER PUBLICATIONS

Office Action issued on Sep. 13, 2022, in related Chinese Patent Application No. 202111129797.1, 14 pages.

Rejection Decision issued on Feb. 28, 2023, in related Chinese Patent Application No. 202111129797.1, 10 pages.

Office Action issued on Apr. 12, 2024, in corresponding Korean Application No. 10-2023-7029566, 13 pages.

* cited by examiner

DRIVING METHOD AND DRIVING DEVICE FOR A DISPLAY PANEL, AND DISPLAY DEVICE

CROSS-REFERENCE TO RELATED APPLICATION

This is a continuation of International Patent Application NO. PCT/CN2022/088091, filed on Apr. 21, 2022, which claims priority to a Chinese Patent Application No. CN202111129797.1 filed on Sep. 26, 2021, the disclosure of which is incorporated herein by reference in its entirety.

TECHNICAL FIELD

The present disclosure relates to the field of display technology, for example, a driving method and driving device for a display panel, and a display device.

BACKGROUND

An organic light-emitting diode (OLED) panel has advantages of self-luminescence, low drive voltage, high luminescence efficiency, fast response speed, lightness and thinness and high contrast ratio, and is increasingly widely applied to devices with a display function such as a mobile phone and a computer.

An OLED display product is prone to flicker in a low-frequency display mode, thereby affecting a display effect of the display device.

SUMMARY

The present disclosure provides a driving method and driving device for a display panel, and a display device, so as to improve a flicker phenomenon of the display panel and improve a display effect in a relatively low-frequency drive mode.

The present disclosure provides a driving method for a display panel. The display panel includes a light-emitting structure and a driving circuit that drives the light-emitting structure to emit light. The driving circuit includes a drive transistor. A drive mode of the display panel includes a first drive mode. The first drive mode includes a plurality of first driving cycles. Each of the plurality of first driving cycles includes a first driving stage and a second driving stage. The driving method includes: in the first driving stage, controlling a data voltage signal input terminal to transmit a voltage corresponding to a data voltage to a gate of the drive transistor; and in the second driving stage, controlling the data voltage signal input terminal to input a hold voltage to a source of the drive transistor to couple the voltage of the gate of the drive transistor through the hold voltage of the source of the drive transistor.

The present disclosure further provides a driving device for a display panel. The display panel includes a light-emitting structure and a driving circuit that drives the light-emitting structure to emit light. The driving circuit includes a drive transistor. A drive mode of the display panel includes a first drive mode. The first drive mode includes a plurality of first driving cycles. Each of the plurality of first driving cycles includes a first driving stage and a second driving stage.

The driving device is configured to control a data voltage signal input terminal to transmit a voltage corresponding to a data voltage to a gate of the drive transistor in the first driving stage and also configured to control the data voltage signal input terminal to transmit a hold voltage to a source of the drive transistor in the second driving stage to couple the voltage of the gate of the drive transistor through the hold voltage of the source of the drive transistor.

The present disclosure further provides a display device. The display device includes a display panel and the driving device for the display panel.

The present disclosure provides the driving method and driving device for the display panel, and the display device. The display panel includes the light-emitting structure and the driving circuit that drives the light-emitting structure to emit light. The driving circuit includes the drive transistor. The drive mode of the display panel includes the first drive mode. The first drive mode includes the plurality of first driving cycles. Each first driving cycles include the first driving stage and the second driving stage. The driving method includes: in the first driving stage, controlling the data voltage signal input terminal to transmit the voltage corresponding to the data voltage to the gate of the drive transistor; and in the second driving stage, controlling the data voltage signal input terminal to transmit the hold voltage to the source of the drive transistor to couple the voltage of the gate of the drive transistor through the hold voltage of the source of the drive transistor, thereby canceling a potential variation of the gate of the drive transistor caused by an electrical leakage phenomenon of a storage capacitor, reducing a fluctuation of a potential of the gate of the drive transistor, improving or even eliminating the flicker phenomenon of the display panel and improving the display effect of the display panel in the relatively low-frequency drive mode, i.e., the first drive mode.

DETAILED DESCRIPTION

Figure 1:
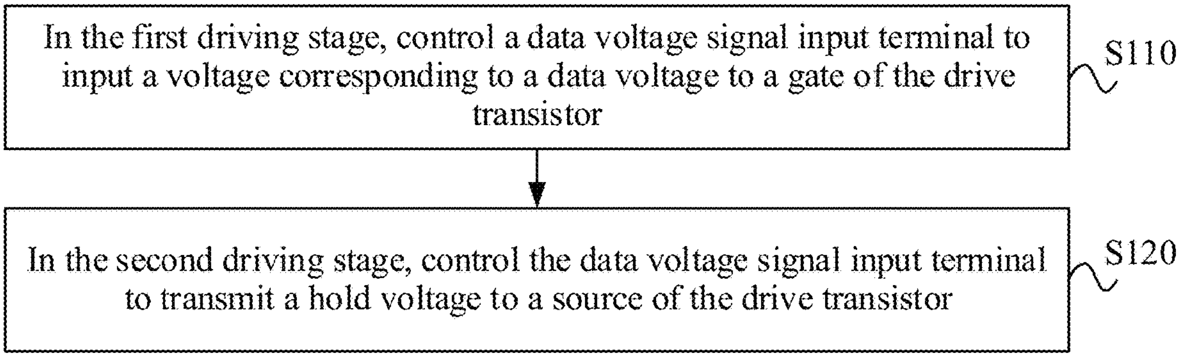
FIG. 1 is a flowchart of a driving method for a display panel according to an embodiment of the present disclosure.

The present disclosure is described below in conjunction with drawings and embodiments. It is to be understood that the embodiments set forth below are intended to illustrate and not to limit the present disclosure. Additionally, it is to be noted that for ease of description, only part of structures related to the present disclosure are illustrated in the drawings.

Generally, an organic light-emitting display panel includes a light-emitting structure and a driving circuit that drives the light-emitting structure to emit light. A drive transistor in the driving circuit can generate a drive current, and the light-emitting structure emits light in response to the drive current. The drive current is determined by a voltage difference (Vgs) between a source of the drive transistor and a gate of the drive transistor. The source of the drive transistor receives a power supply voltage, which is an active signal and relatively stable. The gate of the drive transistor receives a data voltage and stores a voltage corresponding to the data voltage in a storage capacitor. Since the storage capacitor has a current leakage phenomenon, a potential of the gate of the drive transistor has relatively strong uncontrollability, compared with a potential of the source of the drive transistor, resulting in that the drive current generated by the drive transistor is closely related to the potential of the gate of the drive transistor with the relatively strong uncontrollability. A current OLED display product includes at least two display modes: one is a low-frequency display mode, and the other is a high-frequency display mode. An application scenario corresponding to the high-frequency display mode, such as dynamic image display of a game and a movie and television, is a conventional mode of a mobile phone. An application scenario corresponding to the low-frequency display mode is a low-refresh-rate application scenario such as standby and e-book. For low-frequency display, a Long V manner (that is, a frame skip mode) is generally used. During the low-frequency display, a display stage includes a write stage and a hold stage. For example, a high refresh rate of the display panel is 120 Hz, and duration of scanning from a first row of the display panel to a last row of the display panel is approximately 8.3 ms; and a low refresh rate of the display panel is 10 Hz, and duration of scanning from the first row of the display panel to the last row of the display panel is 100 ms. That is, the time for refreshing the display panel with the refresh rate of 10 Hz once can be used for refreshing the display panel with the refresh rate of 120 Hz 12 times. After the display panel switches from the mode where the refresh rate is 120 Hz to the mode where the refresh rate is 10 Hz, the voltage corresponding to the data voltage is written once to the gate of the drive transistor within first 8.3 ms. The interval from 8.3 ms to 100 ms (equivalent to the latter 11 times) is the hold stage, in which the voltage corresponding to the data voltage is not written, and only light emission driving is performed.

After the voltage corresponding to the data voltage is written to the gate of the drive transistor in the data write stage, the drive transistor generates a drive current to drive the light-emitting structure to emit light and enter a light emission hold stage of this frame. In the hold stage in the low-frequency display mode, the potential of the gate of the drive transistor is maintained by relying on the storage capacitor connected to the gate of the drive transistor so that the light emission of the light-emitting structure is maintained. However, since each frame in the low-frequency display mode takes a relatively long time and an electrical leakage phenomenon exists in the storage capacitor, the potential of the gate of the drive transistor is affected, and brightness of the light-emitting structure is affected. Therefore, an apparent flicker phenomenon will occur, which severely affects a display effect of the low-frequency display.

In view of this, embodiments of the present disclosure provide a driving method for a display panel. The display panel includes a light-emitting structure and a driving circuit that drives the light-emitting structure to emit light. The driving circuit includes a drive transistor. A drive mode of the display panel includes a first drive mode. The first drive mode includes a plurality of first driving cycles. Each of the plurality of first driving cycles includes a first driving stage and a second driving stage. FIG. 1 is a flowchart of a driving method for a display panel according to an embodiment of the present disclosure. Referring to FIG. 1, the driving method includes the steps described below.

In S110, in the first driving stage, a data voltage signal input terminal is controlled to transmit a voltage corresponding to a data voltage to a gate of the drive transistor.

The drive mode of the display panel includes the first drive mode, and the first drive mode may be understood as a low-frequency display mode. The first drive mode includes the plurality of first driving cycles. In each first driving cycle, the display panel is refreshed once, that is, each first driving cycle is duration corresponding to one frame in the low-frequency display mode. Exemplarily, in the low-frequency display mode, a refresh rate of the display panel is 10 Hz, and the data voltage is written through progressive scanning. Duration of scanning from a first row of the display panel to a last row of the display panel is 100 ms, and each first driving cycle is 100 ms. Each first driving cycle includes the first driving stage, and the first driving stage may be understood as a stage in the low-frequency display mode in which the voltage corresponding to the data voltage is written to the gate of the drive transistor and a stage in the low-frequency display mode in which the light-emitting structure is driven to emit light after the data voltage is written. Therefore, in the first driving stage, the data voltage signal input terminal needs to be controlled to transmit the voltage corresponding to the data voltage to the gate of the drive transistor.

In S120, in the second driving stage, the data voltage signal input terminal is controlled to transmit a hold voltage to a source of the drive transistor.

Each first driving cycle further includes the second driving stage, and the second driving stage corresponds to a hold stage in a low-frequency display mode in the related art. Different from the hold stage in the low-frequency display mode in the related art, in the technical solution provided in the embodiment of the present disclosure, in the second driving stage, the data voltage signal input terminal is controlled to transmit the hold voltage to the source of the drive transistor to couple the voltage of the gate of the drive transistor through the hold voltage of the source of the drive transistor, namely, a potential variation of the source of the drive transistor is coupled to the gate of the drive transistor, thereby canceling a potential variation of the gate of the drive transistor caused by an electrical leakage phenomenon of a storage capacitor, reducing a fluctuation of a potential of the gate of the drive transistor, improving or even eliminating a flicker phenomenon of the display panel. In this manner, a display effect of the display panel in a relatively low-frequency drive mode (i.e., the first drive mode) is improved.

The driving method for the display panel provided in the embodiment of the present disclosure includes: in the first driving stage, controlling the data voltage signal input terminal to transmit the voltage corresponding to the data voltage to the gate of the drive transistor; and in the second driving stage, controlling the data voltage signal input terminal to transmit the hold voltage to the source of the drive transistor to couple the voltage of the gate of the drive transistor through the hold voltage of the source of the drive transistor, thereby canceling the potential variation of the gate of the drive transistor caused by the electrical leakage phenomenon of the storage capacitor, reducing the fluctuation of the potential of the gate of the drive transistor, improving or even eliminating the flicker phenomenon of the display panel. In this manner, a display effect of the display panel in a relatively low-frequency drive mode (i.e., the first drive mode) is improved.

Optionally, duration of the second driving stage is greater than or equal to duration of the first driving stage.

In each first driving stage, the number of times the data voltage signal input terminal is controlled to transmit the voltage corresponding to the data voltage to the gate of the drive transistor is one, and in each second driving stage, the number of times the data voltage signal input terminal is controlled to transmit the hold voltage to the source of the drive transistor is N−1, where N is an integer greater than or equal to 2.

The duration of the second driving stage is greater than or equal to the duration of the first driving stage. If the duration of the second driving stage is equal to the duration of the first driving stage, the number of times the data voltage signal input terminal is controlled to transmit the hold voltage to the source of the drive transistor is the same as the number of times the data voltage signal input terminal is controlled to transmit the voltage corresponding to the data voltage to the gate of the drive transistor, both of which are one. If the duration of the second driving stage is greater than the duration of the first driving stage, the number of times the data voltage signal input terminal is controlled to transmit the hold voltage to the source of the drive transistor is greater than the number of times the data voltage signal input terminal is controlled to transmit the voltage corresponding to the data voltage to the gate of the drive transistor. That is, in each second driving stage, the number of times the data voltage signal input terminal is controlled to transmit the hold voltage to the source of the drive transistor is at least one. The number of times the data voltage signal input terminal is controlled to transmit the hold voltage to the source of the drive transistor is related to the duration of the second driving stage. The longer the duration of the second driving stage is, the greater the number of times the data voltage signal input terminal is controlled to input the hold voltage to the source of the drive transistor is. Therefore, it can be ensured that even if the refresh rate of the display panel is lower, the flicker phenomenon of the display panel can be improved or even eliminated, improving the display effect of the display panel in the relatively low-frequency drive mode, i.e., the first drive mode.

Optionally, after controlling the data voltage signal input terminal to transmit the voltage corresponding to the data voltage to the gate of the drive transistor in the first driving stage, the method further includes: controlling the drive transistor to transmit a drive current to the light-emitting structure to drive the light-emitting structure to emit light.

After controlling the data voltage signal input terminal to transmit the hold voltage to the source of the drive transistor each time in the second driving stage, the method further includes: controlling the drive transistor to transmit a drive current to the light-emitting structure to drive the light-emitting structure to emit light.

After controlling the data voltage signal input terminal to transmit the voltage corresponding to the data voltage to the gate of the drive transistor in the first driving stage, the drive transistor further needs to be controlled to transmit the drive current to the light-emitting structure to drive the light-emitting structure to emit light. Moreover, after controlling the data voltage signal input terminal to transmit the hold voltage to the source of the drive transistor each time in the second driving stage, the drive transistor also needs to be controlled to transmit the drive current to the light-emitting structure to drive the light-emitting structure to emit light. The number of times the data voltage signal input terminal is controlled to transmit the hold voltage to the source of the drive transistor is the same as the number of times the drive transistor is controlled to transmit the drive current to the light-emitting structure to drive the light-emitting structure to emit light. In one first driving cycle, after the voltage corresponding to the data voltage is transmitted once to the gate of the drive transistor in the first driving stage, the light-emitting structure emits light once; in the subsequent second driving stage, the hold voltage is transmitted (N−1) times to the source of the drive transistor, and the light-emitting structure emits light (N−1) times, so that in the entire first driving cycle, a potential variation of the gate is relatively small and a variation of brightness is relatively small, thereby improving or even eliminating the flicker phenomenon of the display panel and improving the display effect of the display panel in the relatively low-frequency drive mode, i.e., the first drive mode.

Optionally, the duration of the second driving stage may be set to be (N−1) times the duration of the first driving stage, and light emission duration of the light-emitting structure that is driven each time is equal. As opened above, in each first driving stage, the number of times the data voltage signal input terminal is controlled to transmit the voltage corresponding to the data voltage to the gate of the drive transistor is one, and in each second driving stage, the number of times the data voltage signal input terminal is controlled to transmit the hold voltage to the source of the drive transistor is N−1. Duration of transmitting the hold voltage to the source of the drive transistor each time is the same so that duration of writing the voltage corresponding to the data voltage to the gate of the drive transistor in the first driving stage is also the same as duration of transmitting the hold voltage to the source of the drive transistor each time in the second driving stage. That is, the first driving stage includes a first write stage and a first light emission stage, and the second driving stage includes (N−1) sub-driving cycles, where each sub-driving cycle includes a second write stage and a second light emission stage. Duration of the first write stage is the same as duration of the second write stage, and duration of the first light emission stage is the same as duration of the second light emission stage. In this manner, duration of each sub-driving cycle in the second driving stage may be the same, and the duration of each sub-driving cycle in the second driving stage is the same as the duration of the first driving stage, thereby improving the uniformity of the brightness of the light-emitting structure in a plurality of stages.

Figure 2:
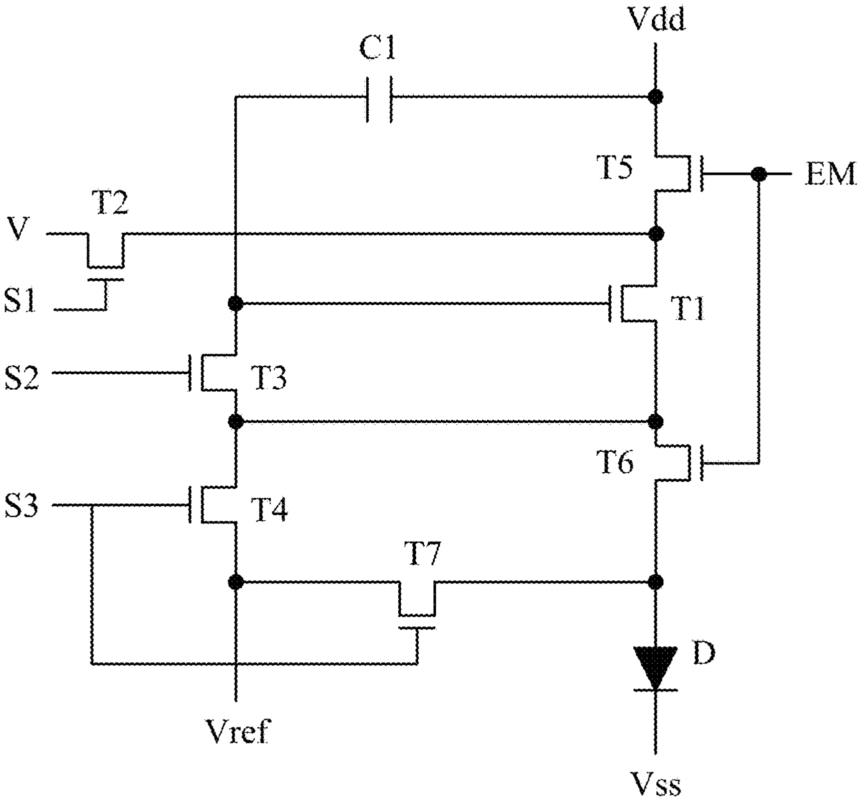
FIG. 2 is a circuit diagram of a pixel driving circuit according to an embodiment of the present disclosure.

Optionally, FIG. 2 is a circuit diagram of a driving circuit according to an embodiment of the present disclosure. Referring to FIG. 2, the driving circuit further includes a data write transistor T2, a compensation transistor T3, a first light emission control transistor T5 and a second light emission control transistor T6. A first terminal of the data write transistor T2 is connected to the data voltage signal input terminal V, and a second terminal of the data write transistor T2 is connected to a source of the drive transistor T1 and a first terminal of the first light emission control transistor T5. A second terminal of the first light emission control transistor T5 is connected to a power supply voltage input terminal Vdd. A drain of the drive transistor T1 is connected to a first terminal of the second light emission control transistor T6 and a first terminal of the compensation transistor T3. A second terminal of the compensation transistor T3 is connected to the gate of the drive transistor T1 and a storage capacitor C1. A second terminal of the second light emission control transistor T6 is connected to the light-emitting structure D. The light-emitting structure D is also connected to a power supply input terminal Vss. A control terminal of the data write transistor T2, a control terminal of the compensation transistor T3, a control terminal of the first light emission control transistor T5 and a control terminal of the second light emission control transistor T6 each receive a respective control signal to control conduction between the respective first and second terminals. Referring to FIG. 2, the control terminal of the data write transistor T2 may be connected to a first scan signal line S1, the on state of the data write transistor T2 is controlled by controlling an electric signal on the first scan signal line S1; the control terminal of the compensation transistor T3 may be connected to a second scan signal line S2, the on state of the compensation transistor T3 is controlled by controlling an electric signal on the second scan signal line S2; and the control terminal of the first light emission control transistor T5 and the control terminal of the second light emission control transistor T6 may receive an electric signal of a light emission control signal line EM, the on states of the first light emission control transistor T5 and the second light emission control transistor T6 are controlled by controlling the electric signal of the light emission control signal line EM.

Figure 3:
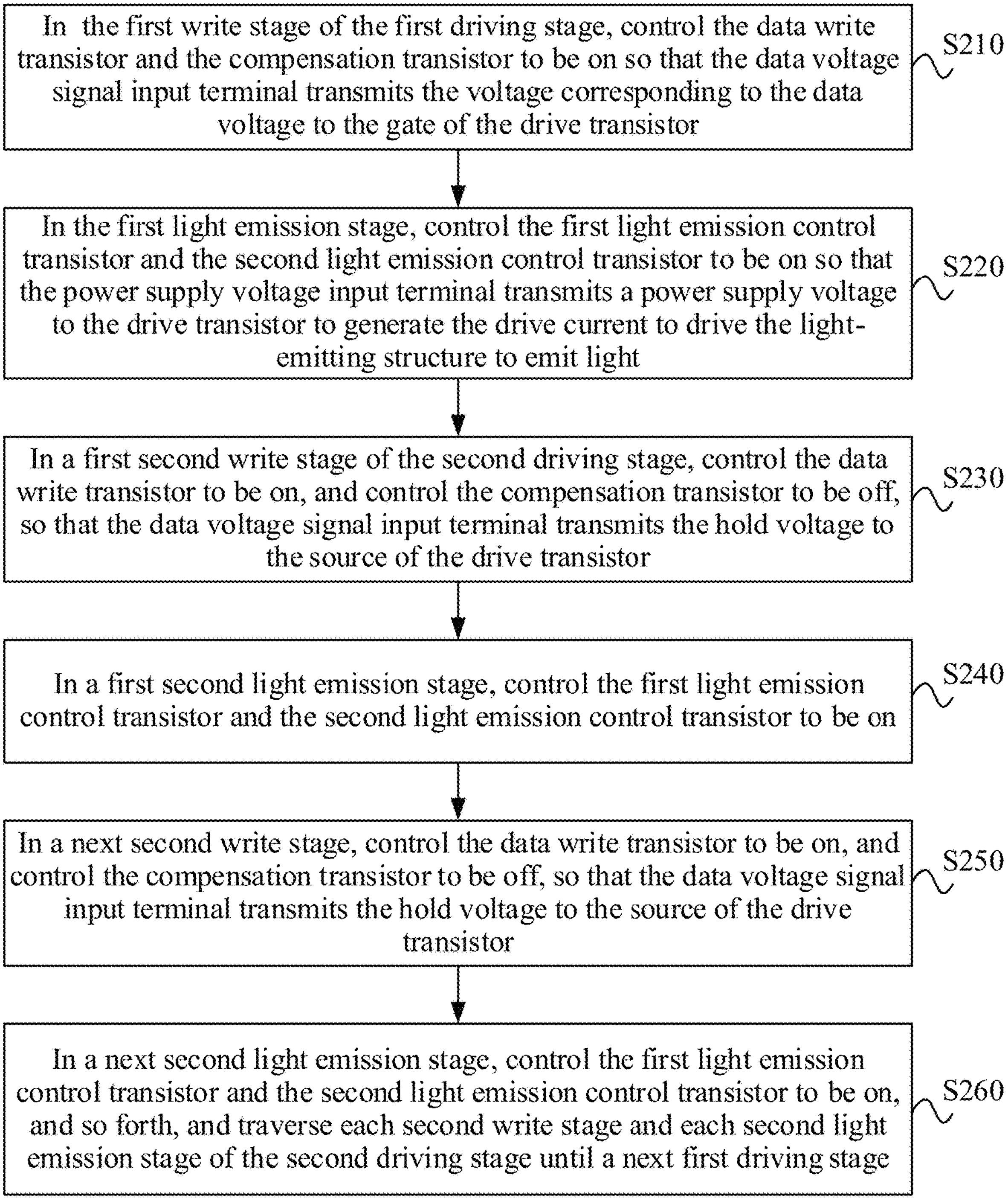
FIG. 3 is a flowchart of another driving method for a display panel according to an embodiment of the present disclosure.

FIG. 3 is a flowchart of another driving method for a display panel according to an embodiment of the present disclosure. Referring to FIG. 3 in conjunction with FIG. 2, the driving method includes the steps described below.

In S210, in the first driving stage, in the first write stage, the data write transistor and the compensation transistor are controlled to be on so that the data voltage signal input terminal transmits the voltage corresponding to the data voltage to the gate of the drive transistor.

Figure 4:
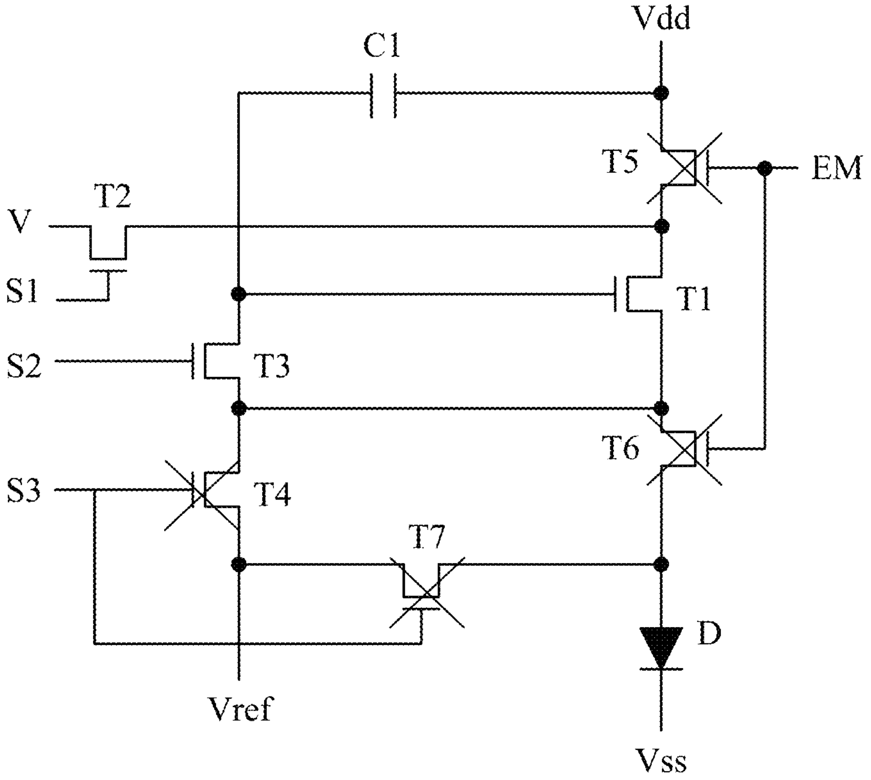
FIG. 4 is a schematic diagram illustrating on states of a plurality of transistors of a driving circuit in a first write stage according to an embodiment of the present disclosure.

FIG. 4 is a schematic diagram illustrating on states of a plurality of transistors of a driving circuit in a first write stage according to an embodiment of the present disclosure. Referring to FIG. 4, in the first write stage of the first driving stage, a level signal for enabling conduction between the first terminal and second terminal of the data write transistor T2 is input into the control terminal of the data write transistor T2, and a level signal for enabling conduction between the first terminal and second terminal of the compensation transistor T3 is input into the control terminal of the compensation transistor T3. The control terminal of the data write transistor T2 is connected to the first scan signal line S1, and the control terminal of the compensation transistor T3 is connected to the second scan signal line S2. In some embodiments, both the data write transistor T2 and the compensation transistor T3 are p-type transistors, an in the case where the level signals applied to the control terminal of the data write transistor T2 and the control terminal of the compensation transistor T3 are at a low level, the data write transistor T2 and the compensation transistor T3 are turned on. In some embodiments, both the data write transistor T2 and the compensation transistor T3 are n-type transistors, and in the case where the level signals applied to the control terminal of the data write transistor T2 and the control terminal of the compensation transistor T3 are at a high level, the data write transistor T2 and the compensation transistor T3 are turned on. After the data write transistor T2 and the compensation transistor T3 are turned on, the voltage (the voltage corresponding to the data voltage) obtained after the data voltage input from the data voltage signal input terminal V passes through the data write transistor T2, the drive transistor T1 and the compensation transistor T3 in sequence is transmitted to the gate of the drive transistor T1. That is, the voltage obtained after the data voltage is compensated is transmitted to the gate of the drive transistor T1, and the voltage corresponding to the data voltage charges the storage capacitor C1 connected to the gate of the drive transistor T1 to maintain the potential of the gate of the drive transistor T1.

In S220, in the first light emission stage, the first light emission control transistor and the second light emission control transistor are controlled to be on so that the power supply voltage input terminal transmits a power supply voltage to the drive transistor to generate the drive current so as to drive the light-emitting structure to emit light.

Figure 5:
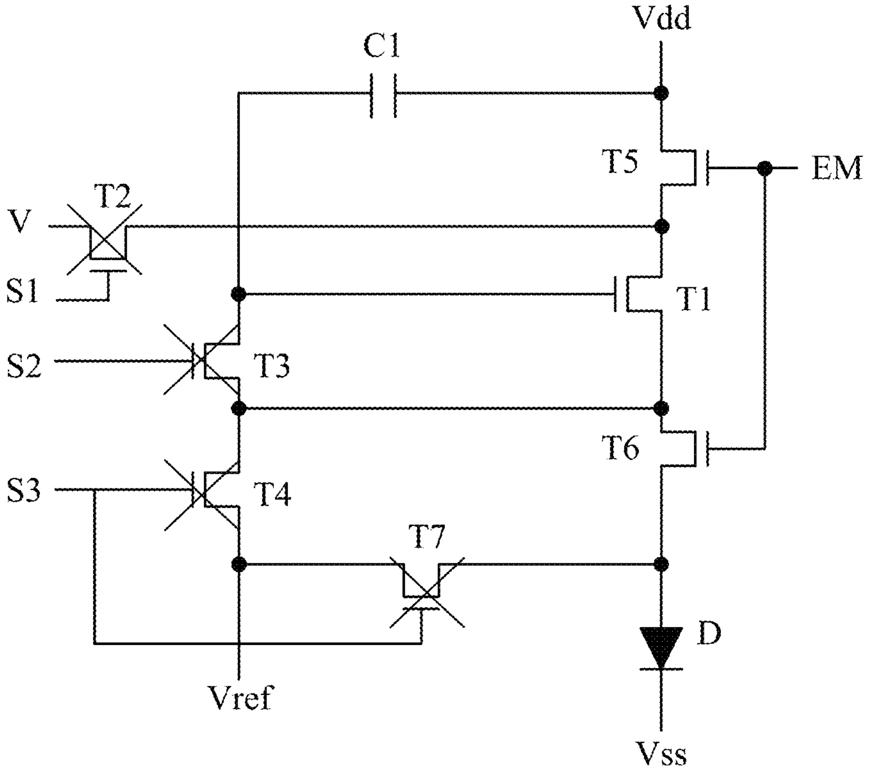
FIG. 5 is a schematic diagram illustrating on states of a plurality of transistors of the driving circuit in a first light emission stage according to an embodiment of the present disclosure.

FIG. 5 is a schematic diagram illustrating on states of a plurality of transistors of the driving circuit in a first light emission stage according to an embodiment of the present disclosure. Referring to FIG. 5, after the data voltage signal input terminal V transmits the voltage corresponding to the data voltage to the gate of the drive transistor T1, a respective control signal is transmitted to each of the control terminal of the first light emission control transistor T5 and the control terminal of the second light emission control transistor T6 to control conduction between the respective first and second terminals. Optionally, the first light emission control transistor T5 and the second light emission control transistor T6 are transistors of the same type, that is, both are p-type transistors or n-type transistors. The control terminal of the first light emission control transistor T5 and the control terminal of the second light emission control transistor T6 may receive an electric signal of the same light emission control signal line EM, thereby simplifying a circuit connection of the driving circuit. Both the conduction between the first terminal and the second terminal of the first light emission control transistor T5 and the conduction between the first terminal and the second terminal of the second light emission control transistor T6 are controlled so that the power supply voltage input terminal transmits the power supply voltage to the drive transistor T1 to generate the drive current so as to drive the light-emitting structure D to emit light.

In S230, in the second driving stage, in a first second write stage, the data write transistor is controlled to be on and the compensation transistor is controlled to be off, so that the data voltage signal input terminal transmits the hold voltage to the source of the drive transistor.

Figure 6:
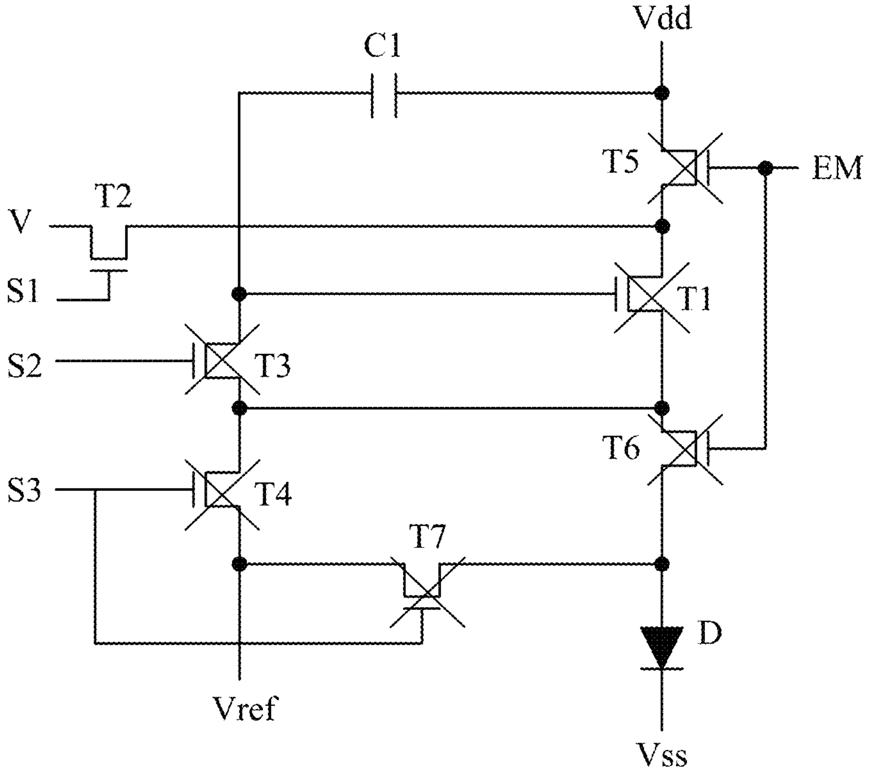
FIG. 6 is a schematic diagram illustrating on states of a plurality of transistors of the driving circuit in a second write stage according to an embodiment of the present disclosure.

The second driving stage includes (N−1) sub-driving cycles, where N is an integer greater than or equal to 2. Each sub-driving cycle includes one second write stage and one second light emission stage. FIG. 6 is a schematic diagram illustrating on states of a plurality of transistors of the driving circuit in a second write stage according to an embodiment of the present disclosure. Referring to FIG. 6, in the first second write stage, the data write transistor T2 is controlled to be on, and the compensation transistor T3 is controlled to be off. In this case, the data voltage signal input terminal V transmits the hold voltage to the source of the drive transistor T1. Therefore, even if the voltage corresponding to the data voltage is not written to the gate of the drive transistor T1 in the second driving stage (the hold stage in the related art) in the low frequency mode, in the technical solution provided in the embodiment of the present disclosure, the data voltage signal input terminal V is controlled to transmit the hold voltage to the source of the drive transistor T1 so that the voltage of the gate of the drive transistor T1 can be coupled through the hold voltage of the source of the drive transistor T1, that is, the potential variation of the source of the drive transistor is coupled to the gate of the drive transistor, thereby canceling the potential variation of the gate of the drive transistor T1 caused by the electrical leakage, reducing the fluctuation of the potential of the gate of the drive transistor T1, improving or even eliminating the flicker phenomenon of the display panel and improving the display effect of the display panel in the relatively low-frequency drive mode, i.e., the first drive mode.

In S240, in a first second light emission stage, the first light emission control transistor and the second light emission control transistor are controlled to be on.

Both the conduction between the first terminal and the second terminal of the first light emission control transistor T5 and the conduction between the first terminal and the second terminal of the second light emission control transistor T6 are controlled so that the power supply voltage input terminal transmits the power supply voltage to the drive transistor T1 to generate the drive current so as to drive the light-emitting structure D to emit light. Step S240 is the same as step S220, and reference may be made to FIG. 5, which is not repeated here.

In S250, in a next second write stage, the data write transistor is controlled to be on, and the compensation transistor is controlled to be off, so that the data voltage signal input terminal transmits the hold voltage to the source of the drive transistor.

Reference may be made to FIG. 6, and step S250 is the same as step S230, which is not repeated here.

In S260, in a next second light emission stage, the first light emission control transistor and the second light emission control transistor are controlled to be on, and so forth. In this manner, each second write stage and each second light emission stage of the second driving stage are traversed until a next first driving stage.

Reference may be made to FIG. 5, and the transistors turned on in the light emission stage are the same, which is not repeated here. The second driving stage includes (N−1) sub-driving cycles, where each sub-driving cycle includes one second write stage and one second light emission stage. Therefore, each second write stage and each second light emission stage of the second driving stage are traversed until the next first driving stage.

In some embodiments, before the first write stage, a first initialization stage may further be included. Before each second write stage, a second initialization stage may further be included. In the first initialization stage, a first initialization voltage is transmitted to the gate of the drive transistor T1 and an anode of the light-emitting structure D to initialize the potential of the gate of the drive transistor T1 and a potential of the anode of the light-emitting structure D. The potential of the gate of the drive transistor T1 is initialized so that conduction between the first terminal and the second terminal of the drive transistor T1 is enabled in the first write stage and the voltage corresponding to the data voltage can be transmitted to the gate of the drive transistor T1 by normally passing through the data write transistor T2, the drive transistor T1 and the compensation transistor T3 in sequence. The potential of the anode of the light-emitting structure D is initialized so that the brightness of the light-emitting structure D is not affected by the potential of the anode of the light-emitting structure D in the first light emission stage. Similarly, in the second initialization stage, a second initialization voltage is transmitted to the anode of the light-emitting structure D so that the brightness of the light emitted by the light-emitting structure D is not affected by the potential of the anode of the light-emitting structure D in the second light emission stage.

Still referring to FIG. 2, a transistor that controls the transmission of the first initialization voltage and the second initialization voltage includes a first initialization transistor T4 and a second initialization transistor T7. A first terminal of the first initialization transistor T4 is connected to the drain of the drive transistor T1 and the first terminal of the compensation transistor T3, a second terminal of the first initialization transistor T4 is connected to a first terminal of the second initialization transistor T7 and an initialization voltage input terminal Vref, and a second terminal of the second initialization transistor T7 is connected to the anode of the light-emitting structure D. The first initialization transistor T4 and the second initialization transistor T7 are transistors of the same type. Therefore, a control terminal of the first initialization transistor T4 and a control terminal of the second initialization transistor T7 may be connected to the same initialization control signal line S3.

Figure 7:
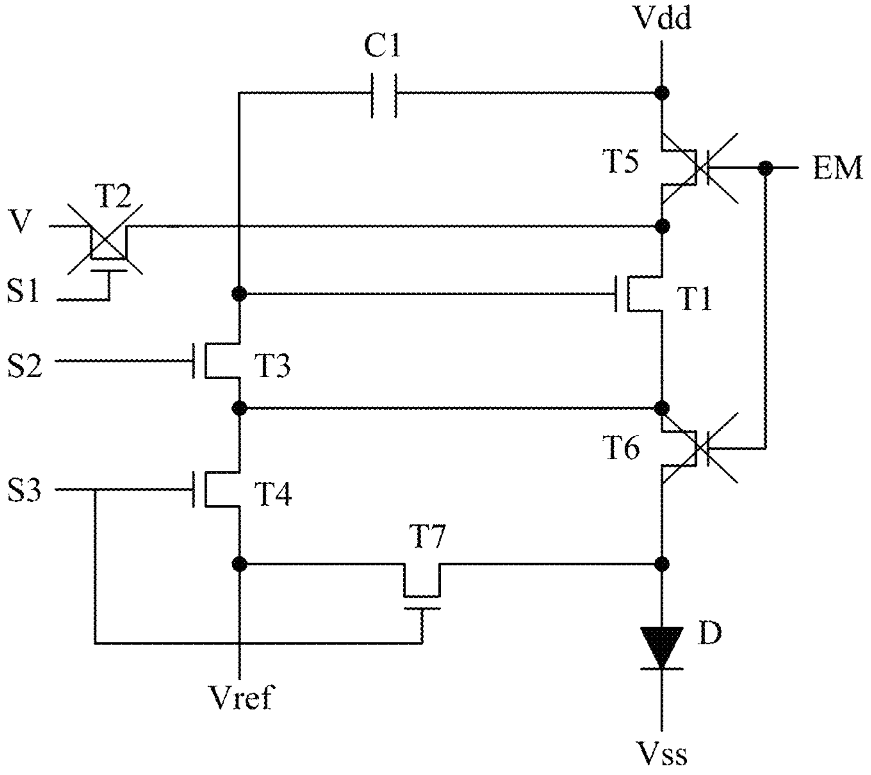
FIG. 7 is a schematic diagram illustrating on states of a plurality of transistors of the driving circuit in a first initialization stage according to an embodiment of the present disclosure.

FIG. 7 is a schematic diagram illustrating on states of a plurality of transistors of the driving circuit in the first initialization stage according to an embodiment of the present disclosure. Referring to FIG. 7, in the first initialization stage, the compensation transistor T3, the first initialization transistor T4 and the second initialization transistor T7 are on, the first initialization voltage is transmitted to the gate of the drive transistor T1 after passing through the first initialization transistor T4 and the compensation transistor T3 in sequence, and the first initialization voltage is transmitted to the anode of the light-emitting structure D after passing through the second initialization transistor T7.

Figure 8:
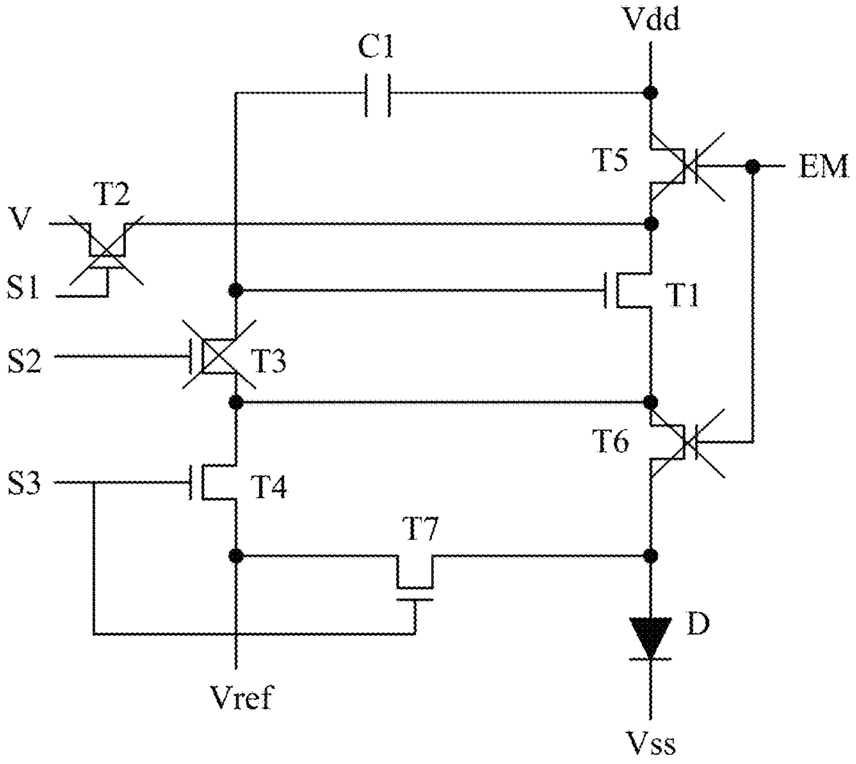
FIG. 8 is a schematic diagram illustrating on states of a plurality of transistors of the driving circuit in a second initialization stage according to an embodiment of the present disclosure.

FIG. 8 is a schematic diagram illustrating on states of a plurality of transistors of the driving circuit in the second initialization stage according to an embodiment of the present disclosure. Referring to FIG. 8, in the second initialization stage, the first initialization transistor T4 and the second initialization transistor T7 are on, and the compensation transistor T3 is off. Therefore, the second initialization voltage can be transmitted to the anode of the light-emitting structure D by the second initialization transistor T7, and the second initialization voltage cannot be transmitted to the gate of the drive transistor T1 by the first initialization transistor T4 and the compensation transistor T3 to prevent that the second initialization voltage affects the potential of the gate of the drive transistor T1 in the second driving stage.

Optionally, the display panel further includes a second drive mode, where the second drive mode includes a second driving cycle, where duration of the first driving cycle is N times duration of the second driving cycle, the duration of the first driving stage is equal to the duration of the second driving cycle, and the second driving cycle includes a third write stage and a third light emission stage.

At the third write stage, the data write transistor T2 and the compensation transistor T3 are controlled to be on so that the data voltage signal input terminal V inputs the voltage corresponding to the data voltage to the gate of the drive transistor T1.

At the third light emission stage, the first light emission control transistor T5 and the second light emission control transistor T6 are controlled to be on.

A refresh rate in the second drive mode is higher than a refresh rate in the first drive mode, and the second drive mode is a high-refresh-rate mode. For example, the refresh rate of the display panel is 120 Hz, and the data voltage is written through the progressive scanning. The duration of scanning from the first row of the display panel to the last row of the display panel is approximately 8.3 ms, and the second driving cycle included in the second drive mode is approximately 8.3 ms. That is, the time for refreshing the display panel at the refresh rate of 10 Hz once can be used for refreshing the display panel with the refresh rate of 120 Hz 12 times. The duration of the first driving cycle is set to be N times the duration of the second driving cycle, and the duration of the first driving stage is equal to the duration of the second driving cycle, so that the duration of each sub-driving cycle of the second driving stage is equal to the duration of the second driving cycle. In this case, when the display panel is switched from the second drive mode (for example, the refresh rate is 120 Hz) to the first drive mode (for example, the refresh rate is 10 Hz), only the on/off state of the compensation transistor T3 and a magnitude of the voltage transmitted by the data voltage signal input terminal V need to be changed and controlled after the display panel enters the second driving stage of the first drive mode, without changing the structure of the driving circuit, thereby improving or even eliminating the flicker phenomenon of the display panel and improving the display effect of the display panel in the relatively low-frequency drive mode, i.e., the first drive mode.

Optionally, in each second driving stage, the source of the drive transistor T1 is transmitted with an equal hold voltage each time. If the drive transistor T1 is a p-type transistor, a difference range between the hold voltage and the data voltage is 1 to 2 V, and if the drive transistor T1 is an n-type transistor, the difference range between the hold voltage and the data voltage is −2 to −1 V.

Figure 9:
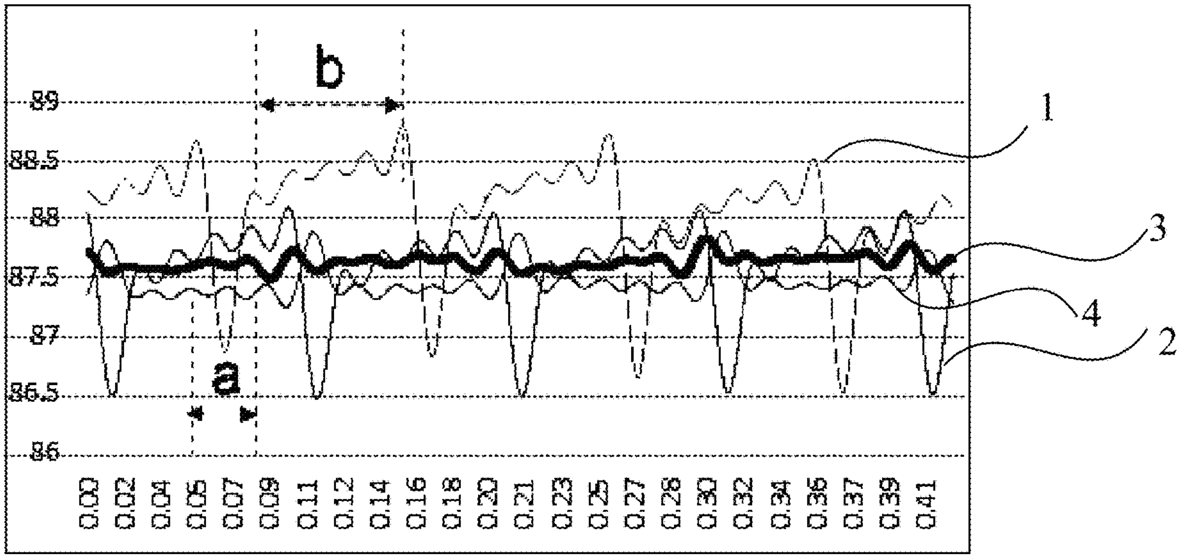
FIG. 9 is a schematic diagram illustrating a fluctuation state of brightness of a light-emitting structure according to an embodiment of the present disclosure.

An objective of the embodiments of the present disclosure is to reduce a difference between a display brightness in the first driving stage and a display brightness in the second driving stage. When magnitudes of the data voltage and the hold voltage are to be determined, the writing of the data voltage is not changed, and the hold voltage in the second driving stage is adjusted. With the brightness of the light-emitting structure D in the first driving stage as a target, the brightness of the light-emitting structure D in the second driving stage is adjusted to approach the brightness of the light-emitting structure D in the first driving stage, thereby ensuring that data is not distorted and is more reliable. FIG. 9 is a schematic diagram illustrating a fluctuation state of brightness of a light-emitting structure D according to an embodiment of the present disclosure. Referring to FIG. 9, the ordinate of the waveform represents the display brightness, and the abscissa of the waveform represents the time of collecting the brightness. Through an adjustment of a voltage difference between the hold voltage and the data voltage, different fluctuation states of the brightness, that is, the characterization index of the flicker, can be obtained. As shown in FIG. 9, four waveforms correspond to different voltage differences, respectively. For example, the drive transistor T1 is a p-type transistor, the waveform 1 is a waveform diagram of the collected brightness with time when the voltage difference between the hold voltage and the data voltage is less than zero, the waveform 2 is a waveform diagram of the collected brightness with time when the voltage difference between the hold voltage and the data voltage is equal to zero, the waveform 3 is a waveform diagram of the collected brightness with the time when the voltage difference between the hold voltage and the data voltage is greater than zero, and the waveform 4 is a waveform diagram of the collected brightness with time when the voltage difference between the hold voltage and the data voltage is greater than the voltage difference corresponding to the waveform 3. As can be seen from the figure, the waveform 3 corresponds to a smallest fluctuation with almost no flicker, that is, the flicker of the display panel in the low frequency is resolved as long as the voltage difference is matched. Through a comparison of the data voltage in the first driving stage and the hold voltage in the second driving stage according to the measured data, the voltage difference can be directly obtained. The voltage difference corresponding to the waveform 3 ranges from 1 to 2 V. If the drive transistor T1 is an n-type transistor and the difference range between the hold voltage and the data voltage is −2 to −1 V, the brightness in the first driving stage is relatively close to the brightness in the second driving stage. The data voltage and the hold voltage can be stored in a driver integrated circuit (IC) of a display device. The driver IC has gamma code partition register addresses of the first driving stage and the second driving stage so that two different voltages are achieved and a corresponding voltage is separately called during low-frequency display.

Optionally, the driving method further includes: collecting an optical brightness value of the light-emitting structure in the first driving stage, and adjusting the voltage corresponding to the data voltage transmitted by the data voltage signal input terminal to the gate of the drive transistor according to the optical brightness value, so that the brightness of the light-emitting structure is a target display brightness; and collecting an optical brightness value of the light-emitting structure in the second driving stage, and adjusting the hold voltage transmitted by the data voltage signal input terminal to the source of the drive transistor according to the optical brightness value, so that the brightness of the light-emitting structure is the target display brightness.

Figure 10:
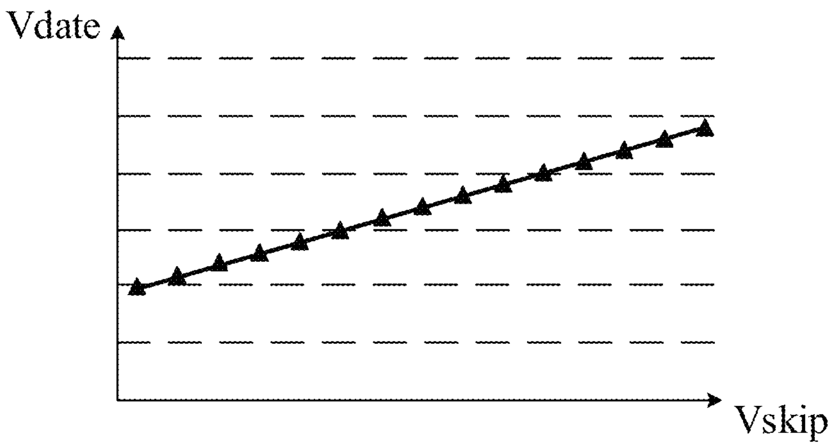
FIG. 10 is a schematic diagram of a gamma curve according to an embodiment of the present disclosure.

The data voltage and the hold voltage may be collectively referred to as a gamma voltage. A gamma curve is a numerical relationship representing the correspondence of the grayscale and the brightness, and the brightness of the display panel is related to the gamma voltage. Therefore, when the gamma voltage (the data voltage and the hold voltage) is adjusted, a plurality of grayscale binding points may be set in the gamma curve, and each grayscale binding point includes a target data voltage and a target hold voltage that correspond to the grayscale binding point. FIG. 10 is a schematic diagram of a gamma curve according to an embodiment of the present disclosure. Referring to FIG. 10, the number of binding points is, for example, 15, and each binding point corresponds to two gamma voltages, which are the data voltage Vdate in the first driving stage and the hold voltage Vskip in the second driving stage, respectively. In a process of adjusting the gamma curve, each binding point can be adjusted. The data voltage transmitted to the drive transistor is adjusted until the brightness of the display panel reaches a target display brightness in a corresponding grayscale, and when the brightness of the display panel is determined to be the target display brightness in the corresponding grayscale, the transmitted data voltage is a target data voltage. The hold voltage transmitted to the source of the drive transistor is adjusted until the brightness of the display panel reaches the target display brightness in the corresponding grayscale, and when the brightness of the display panel is determined to be the target display brightness in the corresponding grayscale, the transmitted hold voltage is a target hold voltage.

For example, the refresh rate in the first drive mode is 10 Hz. In some embodiments, the refresh rate in the first drive mode may be less than 10 Hz. Optical data is collected by a brightness collection device CA410, the collected brightness data is optical data that lasts for 10 ms when the data voltage is transmitted to the drive transistor, and whether the target display brightness in the corresponding grayscale is reached is determined. If the target display brightness in the corresponding grayscale is reached, the data voltage transmitted this time is used as the target data voltage in the grayscale. If the target display brightness in the corresponding grayscale is not reached, the transmitted data voltage is readjusted. With the brightness of the light-emitting structure D at the target data voltage as a standard, the hold voltage is adjusted again. The collection starting time is delayed by 10 ms, and optical data that lasts for 90 ms when the hold voltage is transmitted to the source of the drive transistor is collected by the brightness collection device CA410. It is to be noted that for the first drive mode where the refresh rate is 10 Hz, an accurate value of the duration of the first driving stage is 8.3 ms, and an accurate value of the duration of the second driving stage is 91.7 ms. For ease of the collection of the brightness data, 10 ms is used as duration of collecting the brightness value in the first driving stage, and 90 ms is used as duration of collecting the brightness value in the second driving stage.

Figure 11:
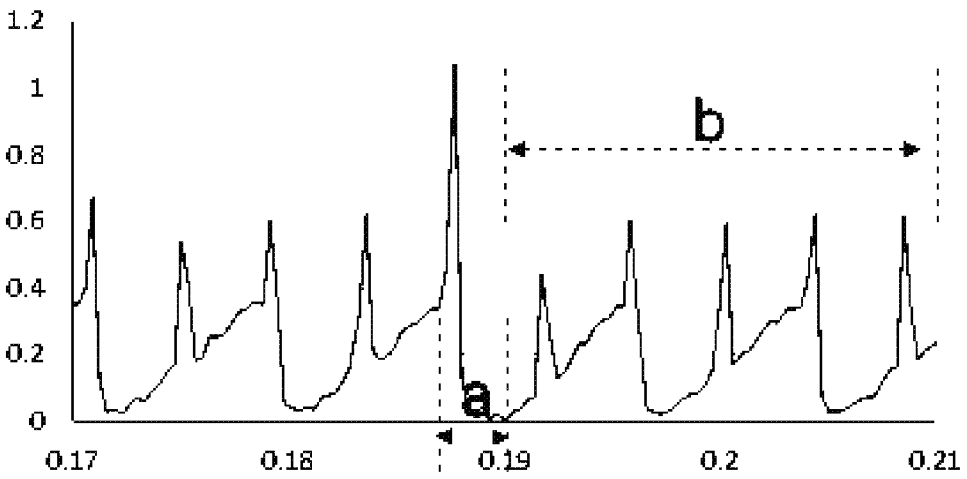
FIG. 11 is a schematic diagram illustrating another fluctuation state of brightness of a light-emitting structure according to an embodiment of the present disclosure.
Figure 12:
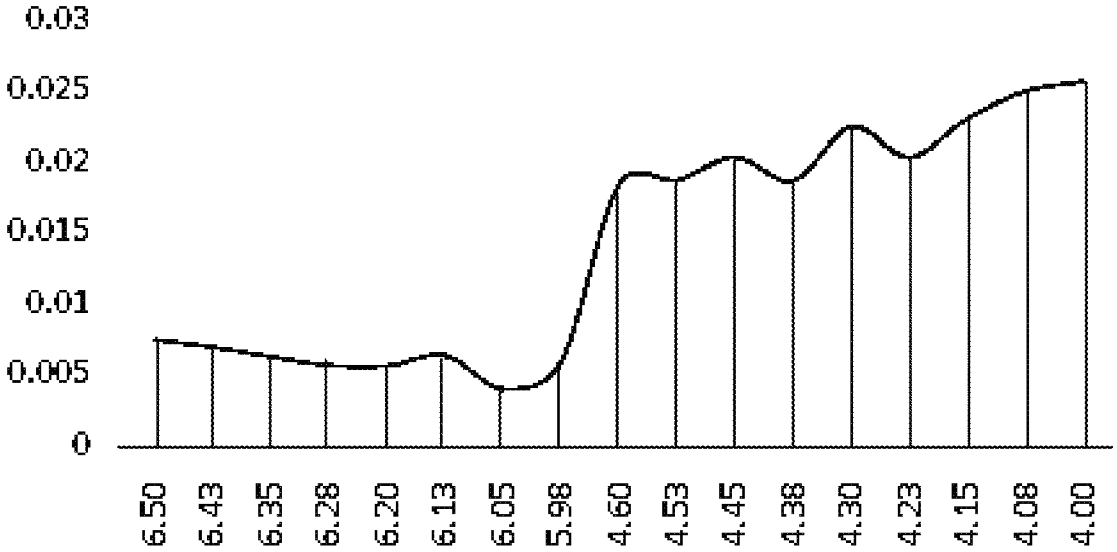
FIG. 12 is a graph illustrating a variation trend of FMA (Flicker Modulation Amplitude) of a group of fluctuation data of brightness of a light-emitting structure according to an embodiment of the present disclosure.

FIG. 11 is a schematic diagram illustrating another fluctuation state of brightness of a light-emitting structure according to an embodiment of the present disclosure. FIG. 12 is a graph illustrating a variation trend of FMA of a group of fluctuation data of brightness of a light-emitting structure according to an embodiment of the present disclosure. Reference is made to FIGS. 11 and 12. The waveform shown in FIG. 11 is a deformed waveform diagram corresponding to the waveform 4 in FIG. 9. The interval a is the first driving stage, and the interval b is the second driving stage. In FIG. 12, the ordinate is the FMA value. In the case where maximum brightness of the group of fluctuation data is the same, the FMA value is determined based on a formula FMA=(MAX−MIN)/MAX. MAX is data corresponding to the maximum brightness of the group of fluctuation data, and MIN is data corresponding to minimum brightness of the group of fluctuation data. Collection duration of the group of fluctuation data may be duration when human eyes can recognize flicker. The larger the FMA value is, the more severe the flicker is; the smaller the FMA value is, the slighter the flicker is. FMA values of different MAX values cannot be directly compared.

Embodiments of the present disclosure further provide a driving device for a display panel. The display panel includes a light-emitting structure and a driving circuit that drives the light-emitting structure to emit light. The driving circuit includes a drive transistor. A drive mode of the display panel includes a first drive mode. The first drive mode includes a plurality of first driving cycles. Each first driving cycle includes a first driving stage and a second driving stage.

The driving device is configured to control a data voltage signal input terminal to transmit a voltage corresponding to a data voltage to a gate of the drive transistor in the first driving stage and also configured to control the data voltage signal input terminal to transmit a hold voltage to a source of the drive transistor in the second driving stage to couple the voltage of the gate of the drive transistor through the hold voltage of the source of the drive transistor.

Figure 13:
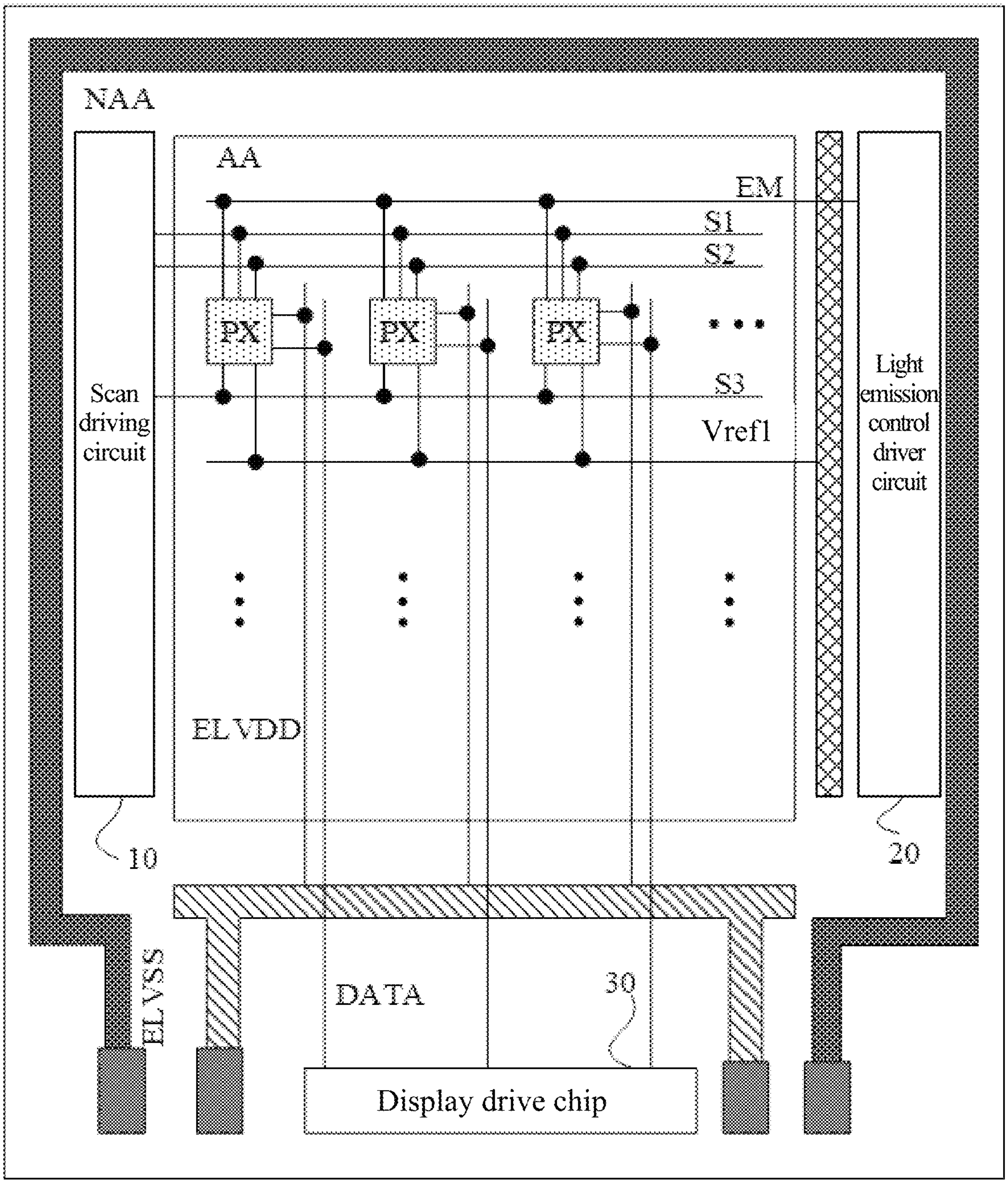
FIG. 13 is a structural diagram of a display device according to an embodiment of the present disclosure.

FIG. 13 is a structural diagram of a display device according to an embodiment of the present disclosure. Referring to FIGS. 13 and 2, the display device includes a display panel. The display panel includes a plurality of sub-pixel units PX arranged in an array. Each sub-pixel unit PX includes a light-emitting structure D and a driving circuit that drives the light-emitting structure D to emit light. The driving circuit includes a drive transistor T1. A drive mode of the display panel includes a first drive mode. The first drive mode includes a plurality of first driving cycles. Each first driving cycle includes a first driving stage and a second driving stage. A driving device is configured to control a data voltage signal input terminal to transmit a data voltage to a source of the drive transistor T1 and finally transmit a voltage corresponding to the data voltage to a gate of the drive transistor T1 in the first driving stage, and control the data voltage signal input terminal to transmit a hold voltage to the source of the drive transistor T1 so as to couple the voltage of the gate of the drive transistor T1 through the hold voltage of the source of the drive transistor T1 in the second driving stage.

Duration of the second driving stage is greater than or equal to duration of the first driving stage. In each first driving stage, the number of times the data voltage signal input terminal is controlled to transmit the data voltage to the drive transistor is one, and in each second driving stage, the number of times of transmitting the hold voltage to the source of the drive transistor is N−1, where N is an integer greater than or equal to 2.

The driving device includes a scan driving circuit 10. The data voltage and the hold voltage are stored in a display drive chip 30. In a first write stage of the first driving stage, the scan driving circuit 10 controls a write transistor T2 to be on through a scan signal line S1 and controls a compensation transistor T3 to be on through a scan signal line S2 so that the display drive chip 30 transmits the data voltage to the data voltage signal input terminal V through a data voltage signal line DATA and transmits the voltage corresponding to the data voltage to the gate of the drive transistor T1. In a second write stage of the second driving stage, the scan driving circuit 10 controls the write transistor T2 to be on through the scan signal line S1 and controls the compensation transistor T3 to be off through the scan signal line S2 so that the hold voltage transmitted by the display drive chip 30 to the data voltage signal input terminal V through the data voltage signal line DATA is transmitted to the source of the drive transistor T1.

The driving device further includes a light emission control driving circuit 20. In a first light emission stage of the first driving stage and a second light emission stage of the second driving stage, the light emission control driving circuit 20 transmits a light emission control signal to the driving circuit through a light emission control signal line EM so that a first light emission control transistor T5 and a second light emission control transistor T6 are on and a power supply voltage transmitted by a power supply voltage transmission line ELVDD is transmitted to the drive transistor T1 to generate a drive current that drives the light-emitting structure D to emit light. In an initialization stage, an initializing voltage signal output line Vref1 transmits a first initialization voltage and a second initialization voltage.

Embodiments of the present disclosure further provide a display device. The display device includes a display panel and the driving device for the display panel in any one of the preceding embodiments. The display device has the same technical effect, which is not repeated here.

In the technical solution provided in the embodiment of the present disclosure, in a second driving stage, a drive module controls a data voltage signal input terminal to transmit a hold voltage to a source of a drive transistor to couple a voltage of a gate of the drive transistor through the hold voltage of the source of the drive transistor, that is, a potential variation of the source of the drive transistor is coupled to the gate of the drive transistor, thereby canceling a potential variation of the gate of the drive transistor caused by an electrical leakage phenomenon of a storage capacitor, reducing a fluctuation of a potential of the gate of the drive transistor, improving or even eliminating a flicker phenomenon of the display panel and improving a display effect of the display panel in a relatively low-frequency drive mode, that is, a first drive mode.

What is claimed is:

1. A driving method for a display panel, the display panel comprising a light-emitting structure and a driving circuit that drives the light-emitting structure to emit light, the driving circuit comprising a drive transistor, a drive mode of the display panel comprising a first drive mode, the first drive mode comprising a plurality of first driving cycles, each of the plurality of first driving cycles comprising a first driving stage and a second driving stage, and the driving method comprising:

in the first driving stage, controlling a data voltage signal input terminal to transmit a voltage corresponding to a data voltage to a gate of the drive transistor, wherein the first driving stage comprises a first write stage and a first light emission stage; and in the second driving stage, controlling the data voltage signal input terminal to transmit a hold voltage to a source of the drive transistor to couple a voltage of the gate of the drive transistor through the hold voltage of the source of the drive transistor, wherein a duration of the second driving stage is N−1 times a duration of the first driving stage, the second driving stage comprises N−1 sub-driving cycles, each of the N−1 sub-driving cycles comprises a second write stage and a second light emission stage, and N is an integer greater than or equal to 2.

2. The method according to claim 1, wherein the duration of the second driving stage is greater than or equal to the duration of the first driving stage.

3. The method according to claim 2, wherein in the first driving stage, a number of times, the data voltage signal input terminal is controlled to transmit the voltage corresponding to the data voltage to the gate of the drive transistor, is one, and in the second driving stage, a number of times, the data voltage signal input terminal is controlled to transmit the hold voltage to the source of the drive transistor, is N−1.

4. The method according to claim 3, after controlling the data voltage signal input terminal to transmit the voltage corresponding to the data voltage to the gate of the drive transistor in the first driving stage, further comprising:

controlling the drive transistor to transmit a drive current to the light-emitting structure, to drive the light-emitting structure to emit light.

5. The method according to claim 4, wherein the driving circuit further comprises a data write transistor, a compensation transistor, a first light emission control transistor and a second light emission control transistor; a first terminal of the data write transistor is connected to the data voltage signal input terminal, and a second terminal of the data write transistor is connected to the source of the drive transistor and a first terminal of the first light emission control transistor; a second terminal of the first light emission control transistor is connected to a power supply voltage input terminal; a drain of the drive transistor is connected to a first terminal of the second light emission control transistor and a first terminal of the compensation transistor; a second terminal of the compensation transistor is connected to the gate of the drive transistor and a storage capacitor; a second terminal of the second light emission control transistor is connected to the light-emitting structure; and a control terminal of the data write transistor, a control terminal of the compensation transistor, a control terminal of the first light emission control transistor and a control terminal of the second light emission control transistor each receive a respective control signal to control conduction between respective first and second terminals; and controlling the drive transistor to transmit the drive current to the light-emitting structure to drive the light-emitting structure to emit light comprises:

controlling conduction between the first terminal and the second terminal of the first light emission control transistor, and controlling conduction between the first terminal and the second terminal of the second light emission control transistor, to make the power supply voltage input terminal transmit a power supply voltage to the drive transistor to generate the drive current to drive the light-emitting structure to emit light.

6. The method according to claim 5, wherein in the first write stage of the first driving stage, the data write transistor and the compensation transistor are controlled to be on to make the data voltage signal input terminal input the voltage corresponding to the data voltage to the gate of the drive transistor; and in the first light emission stage of the first driving stage, the first light emission control transistor and the second light emission control transistor are controlled to be on.

7. The method according to claim 6, wherein before the first write stage, the first driving stage further comprises a first initialization stage; and wherein in the first initialization stage, a first initialization voltage is transmitted to the gate of the drive transistor and an anode of the light-emitting structure separately.

8. The method according to claim 5, wherein in the second write stage of the second driving stage, the data write transistor is controlled to be on and the compensation transistor is controlled to be off, to make the data voltage signal input terminal input the hold voltage to the source of the drive transistor; and in the second light emission stage of the second driving stage, the first light emission control transistor and the second light emission control transistor are controlled to be on.

9. The method according to claim 8, wherein before the second write stage, the each of the sub-driving cycles further comprises a second initialization stage; and wherein in the second initialization stage, a second initialization voltage is transmitted to an anode of the light-emitting structure.

10. The method according to claim 5, wherein the display panel further comprises a second drive mode, wherein the second drive mode comprises a second driving cycle, wherein duration of the first driving cycle is N times duration of the second driving cycle, the duration of the first driving stage is equal to the duration of the second driving cycle, and the second driving cycle comprises a third write stage and a third light emission stage.

11. The method according to claim 10, wherein in the third write stage, the data write transistor and the compensation transistor are controlled to be on, to make the data voltage signal input terminal transmit a voltage corresponding to a data voltage to the gate of the drive transistor; and in the third light emission stage, the first light emission control transistor and the second light emission control transistor are controlled to be on.

12. The method according to claim 10, wherein a refresh rate in the second drive mode is higher than a refresh rate in the first drive mode.

13. The method according to claim 10, further comprising:

collecting an optical brightness value of the light-emitting structure in the first driving stage, and adjusting, according to the optical brightness value, a voltage corresponding to a data voltage transmitted by the data voltage signal input terminal to the gate of the drive transistor, to allow a brightness of the light-emitting structure to reach a target display brightness; and collecting an optical brightness value of the light-emitting structure in the second driving stage, and adjusting, according to the optical brightness value, a hold voltage transmitted by the data voltage signal input terminal to the source of the drive transistor, to allow a brightness of the light-emitting structure to reach the target display brightness.

14. The method according to claim 13, wherein both the data voltage and the hold voltage are gamma voltages.

15. The method according to claim 3, after controlling the data voltage signal input terminal to transmit the hold voltage to the source of the drive transistor each time in the second driving stage, further comprising:

controlling the drive transistor to transmit a drive current to the light-emitting structure to drive the light-emitting structure to emit light.

16. The method according to claim 3, wherein in the second driving stage, the source of the drive transistor is input with an equal hold voltage each time;

in a case where the drive transistor is a p-type transistor, a difference range between the hold voltage and the data voltage is 1 to 2 V; and in a case where the drive transistor is an n-type transistor, the difference range between the hold voltage and the data voltage is −2 to −1 V.

17. A display device comprising:

a display panel; and a driving device for the display panel, wherein the display panel comprises a light-emitting structure and a driving circuit that is configured to drive the light-emitting structure to emit light, the driving circuit comprises a drive transistor, a drive mode of the display panel comprises a first drive mode, the first drive mode comprises a plurality of first driving cycles, each of the plurality of first driving cycles comprises a first driving stage and a second driving stage; and wherein the driving device is configured to:

control a data voltage signal input terminal to transmit a voltage corresponding to a data voltage to a gate of the drive transistor in the first driving stage, wherein the first driving stage comprises a first write stage and a first light emission stage; and control the data voltage signal input terminal to transmit a hold voltage to a source of the drive transistor in the second driving stage so as to couple a voltage of the gate of the drive transistor through the hold voltage of the source of the drive transistor, wherein a duration of the second driving stage is N−1 times a duration of the first driving stage, the second driving stage comprises N−1 sub-driving cycles, each of the N−1 sub-driving cycles comprises a second write stage and a second light emission stage, and N is an integer greater than or equal to 2.

18. A method for a display panel, the display panel comprising a light-emitting structure and a driving circuit that drives the light-emitting structure to emit light, the driving circuit comprising a drive transistor, a drive mode of the display panel comprising a first drive mode, the first drive mode comprising a plurality of first driving cycles, each of the plurality of first driving cycles comprising a first driving stage and a second driving stage, and the method comprising:

in the first driving stage, controlling a data voltage signal input terminal to transmit a voltage corresponding to a data voltage to a gate of the drive transistor; and in the second driving stage, controlling the data voltage signal input terminal to transmit a hold voltage to a source of the drive transistor to couple a voltage of the gate of the drive transistor through the hold voltage of the source of the drive transistor, wherein the display panel further comprises a second drive mode, the second drive mode comprises a second driving cycle, a duration of the first driving stage is equal to a duration of the second driving cycle, and the second driving cycle comprises a third write stage and a third light emission stage.

19. The method according to claim 18, wherein a duration of the second driving stage is greater than or equal to a duration of the first driving stage;

in the first driving stage, a number of times, the data voltage signal input terminal is controlled to transmit the voltage corresponding to the data voltage to the gate of the drive transistor, is one, and in the second driving stage, a number of times, the data voltage signal input terminal is controlled to transmit the hold voltage to the source of the drive transistor, is N−1, wherein N is an integer greater than or equal to 2; and after controlling the data voltage signal input terminal to transmit the voltage corresponding to the data voltage to the gate of the drive transistor in the first driving stage, further comprising:

controlling the drive transistor to transmit a drive current to the light-emitting structure, to drive the light-emitting structure to emit light; and after controlling the data voltage signal input terminal to transmit the hold voltage to the source of the drive transistor each time in the second driving stage, further comprising:

controlling the drive transistor to transmit a drive current to the light-emitting structure to drive the light-emitting structure to emit light; and the driving circuit further comprises a data write transistor, a compensation transistor, a first light emission control transistor and a second light emission control transistor; a first terminal of the data write transistor is connected to the data voltage signal input terminal, and a second terminal of the data write transistor is connected to the source of the drive transistor and a first terminal of the first light emission control transistor; a second terminal of the first light emission control transistor is connected to a power supply voltage input terminal; a drain of the drive transistor is connected to a first terminal of the second light emission control transistor and a first terminal of the compensation transistor; a second terminal of the compensation transistor is connected to the gate of the drive transistor and a storage capacitor; a second terminal of the second light emission control transistor is connected to the light-emitting structure; and a control terminal of the data write transistor, a control terminal of the compensation transistor, a control terminal of the first light emission control transistor and a control terminal of the second light emission control transistor each receive a respective control signal to control conduction between respective first and second terminals; and controlling the drive transistor to transmit the drive current to the light-emitting structure to drive the light-emitting structure to emit light comprises:

controlling conduction between the first terminal and the second terminal of the first light emission control transistor, and controlling conduction between the first terminal and the second terminal of the second light emission control transistor, to make the power supply voltage input terminal transmit a power supply voltage to the drive transistor to generate the drive current to drive the light-emitting structure to emit light.

20. The method according to claim 18, wherein in the third write stage, the data write transistor and the compensation transistor are controlled to be on, to make the data voltage signal input terminal transmit a voltage corresponding to a data voltage to the gate of the drive transistor; and in the third light emission stage, the first light emission control transistor and the second light emission control transistor are controlled to be on; and a refresh rate in the second drive mode is higher than a refresh rate in the first drive mode.

* * * * *